(12) United States Patent
Nakajima et al.

(10) Patent No.: US 6,901,903 B2
(45) Date of Patent: Jun. 7, 2005

(54) COVER STRUCTURE FOR CONSTRUCTION MACHINE COOLING PACKAGE

(75) Inventors: Norio Nakajima, Tokyo (JP); Naotaka Dohke, Tokyo (JP); Akitoshi Nishikawa, Tokyo (JP); Tsuyoshi Doi, Tokyo (JP); Kazuaki Takano, Tokyo (JP); Yuki Takemoto, Osaka (JP); Shigemi Takeuchi, Hyogo (JP); Toshiharu Iizasa, Hyogo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 0 days.

(21) Appl. No.: 10/344,342

(22) PCT Filed: Jun. 21, 2002

(86) PCT No.: PCT/JP02/06231

§ 371 (c)(1),
(2), (4) Date: Feb. 11, 2003

(87) PCT Pub. No.: WO03/002364

PCT Pub. Date: Jan. 9, 2003

(65) Prior Publication Data

US 2003/0168034 A1 Sep. 11, 2003

(30) Foreign Application Priority Data

Jun. 27, 2001 (JP) ........................................ 2001-195361

(51) Int. Cl.[7] ................................................. F02B 77/00
(52) U.S. Cl. ............................. 123/198 E; 123/196 AB; 180/68.1
(58) Field of Search ...................... 180/68.1; 123/198 E, 123/196 AB, 198 A, 41.33, 198 B

(56) References Cited

U.S. PATENT DOCUMENTS 3,630,003 A * 12/1971 Ashton et al. ................ 56/14.7
6,073,594 A    6/2000 Tsukiana et al.

FOREIGN PATENT DOCUMENTS

| JP | 2-30726 U    | 2/1990 |
| JP | 8-183350 A   | 7/1996 |
| JP | 11-123940 A  | 5/1999 |
| JP | 2000-204588 A | 7/2000 |

* cited by examiner

Primary Examiner—Thomas Denion
Assistant Examiner—Zelalem Eshete
(74) Attorney, Agent, or Firm—Birch, Stewart, Kolasch & Birch, LLP

(57) ABSTRACT

In a cooling package for a construction machine, where a cooler (16) from among coolers (15, 16) is disposed separately from an engine (10) and the separately provided cooler (16) includes a screen (19), a lid (30, 50) for covering the screen (19) from above is provided on an upper face of the construction machine independently of a side door (21A, 21B) provided on a side face of the construction machine for covering the cooler (15, 16) from forwardly and an engine hood (22) provided on the upper face of the construction machine for covering the engine (10) and the cooler (15) provided for the engine (10) from above so that, even when the location forwardly of the cooler (16) disposed separately from the engine (10) is occupied by some other apparatus, the screen (19) can be removed or mounted without being disturbed by the apparatus.

25 Claims, 11 Drawing Sheets

F I G. 1
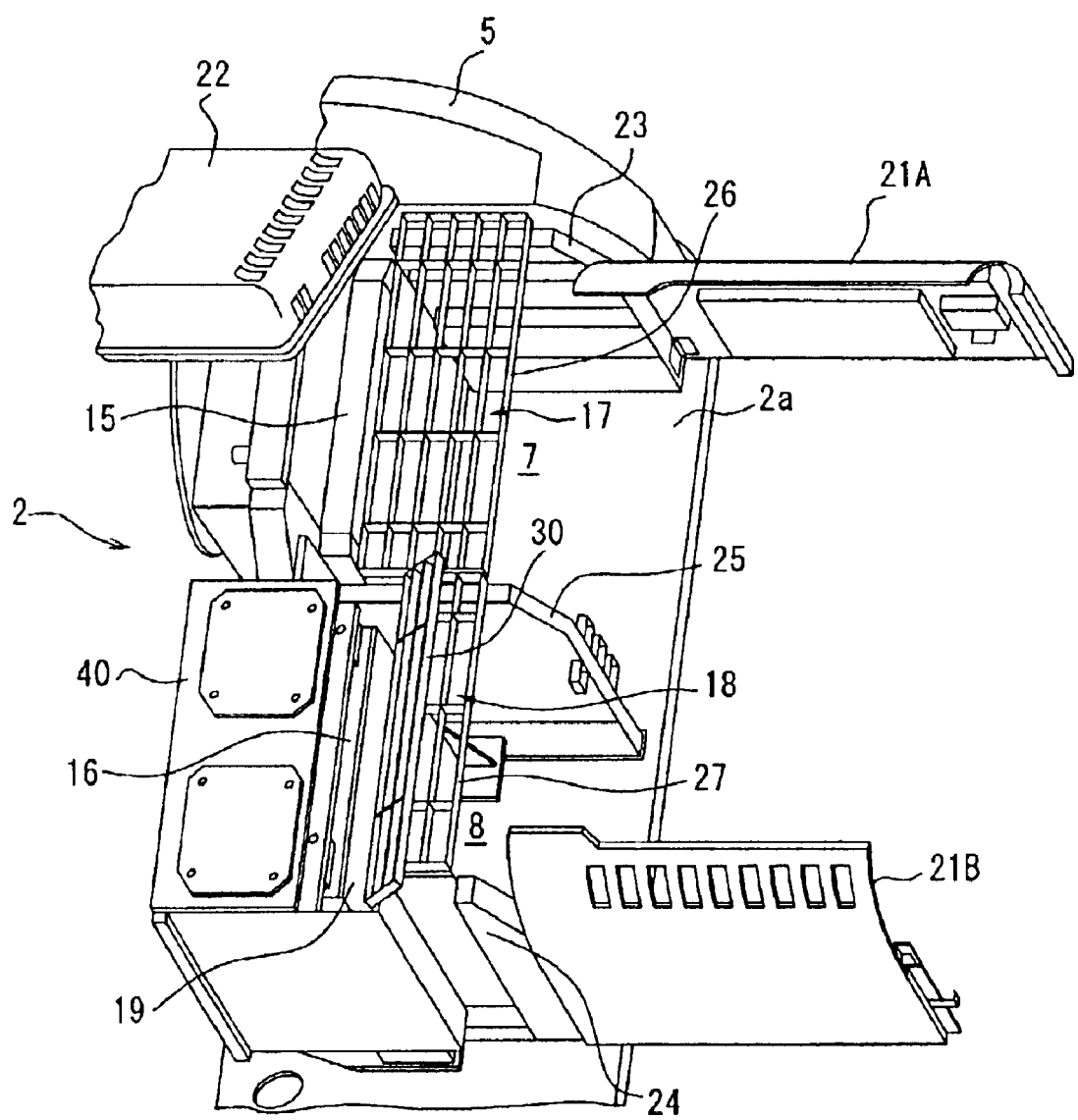

F I G. 8
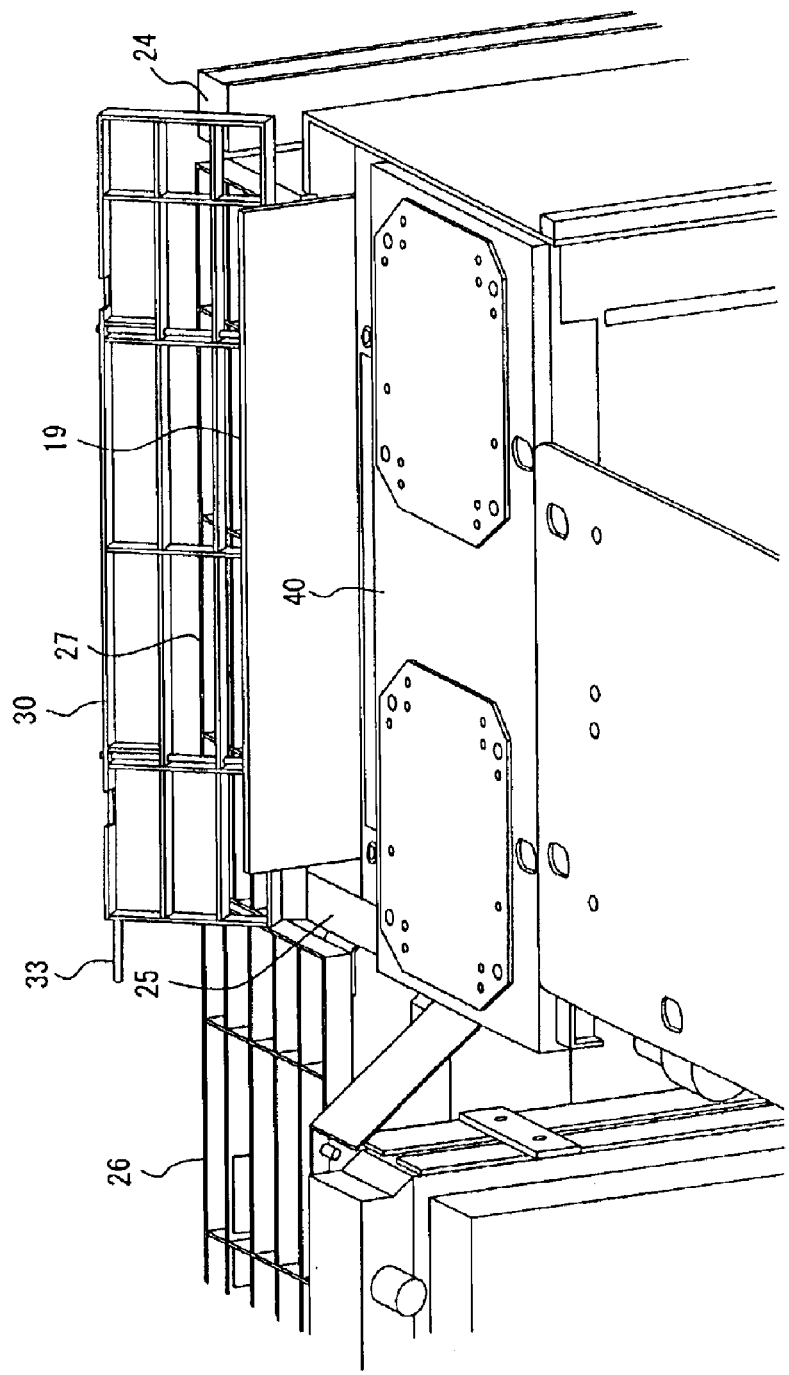

F I G. 11
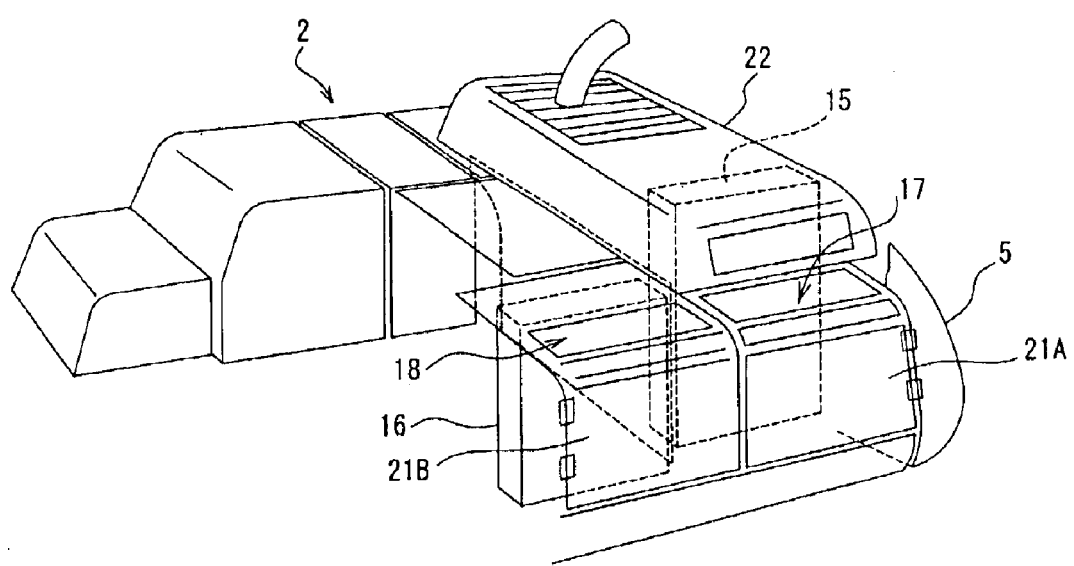

COVER STRUCTURE FOR CONSTRUCTION MACHINE COOLING PACKAGE

This application is the national phase under 35 U.S.C. § 371 of PCT International Application No. PCT/JP02/06231 which has an International filing date of Jun. 21, 2002, which designated the United States of America.

BACKGROUND OF THE INVENTION

1. Field of the Invention

This invention relates to a cooling package for a construction machine such as a hydraulic excavator, and more particularly to a cover structure for a cooling package having a structure wherein a cooler from among coolers such as a radiator and an oil cooler is placed separately from an engine and a screen is provided for the separately placed cooler.

2. Description of Related Art

Nowadays, various construction machines including construction machines of the traveling type such as a hydraulic excavator, construction machines of the stationary type such as a crane, and so forth are used in various fields on construction sites, harbors, in factories and so forth. Construction machines are generally used in severe environments for excavation of rock at a dam, a tunnel, a river, a road or the like, for demolition of a building, a structure or the like, or for other objects. In such environments as just described, the load applied to a component apparatus such as an engine or a hydraulic pump is high, and a rise of the engine temperature or a rise of the temperature of operating oil is likely to occur. Therefore, such construction machines as mentioned above include a radiator and an oil cooler (hereinafter referred to generally as coolers) of a comparatively large capacity, and engine cooling water and operating oil are cooled by the coolers.

Conventionally, the coolers are disposed in series forwardly of the engine and cooled by cooling wind produced by a fan of the engine. However, where a plurality of coolers are arranged in a flow path of cooling wind in this manner, they disturb a flow of the cooling wind and lower the cooling efficiency. Particularly in recent years, not only a radiator and an oil cooler, but also other coolers such as an after cooler and an air condenser and apparatus other than coolers such as an air cleaner are disposed in a flow path of cooling wind, and the worry for a drop of the cooling efficiency is increasing more and more.

Therefore, in recent years, such a cooling package for a construction machine as shown in FIG. 10 has been proposed. The cooling package shown in FIG. 10 is for use with a hydraulic excavator, and the hydraulic excavator includes a lower traveling unit 1, an upper revolving unit 2 disposed for revolving movement on the upper side of the lower traveling unit 1, and a working apparatus 3 provided on the upper revolving unit 2 for carrying out various works. An engine 10 to which a hydraulic pump 11 is connected is disposed horizontally in a space between a cabin 4 provided at a front end portion of the upper revolving unit 2 and a counterweight 5 provided at a rear end portion of the upper revolving unit 2.

In the cooling package, a radiator 15 is disposed forwardly of a first fan 13 which is driven by the engine 10, and a second fan 14 and an oil cooler 16 driven by a motor 12 are disposed between the space in which the engine 10, fan 13 and radiator 15 are disposed and the cabin 4. Due to such a structure as just described, the radiator 3.5 is cooled by cooling wind flowing from an intake 17 formed forwardly and upwardly of the radiator 15 toward the first fan 13 while the oil cooler 16 is cooled separately by cooling wind flowing from another intake 18 formed forwardly and upwardly of the oil cooler 16 toward the second fan 14. By disposing the radiator 15 and the oil cooler 16 separately from each other in this manner, improvement of the cooling efficiency of them is achieved.

Incidentally, since a construction machine is used in such environments as described above, it cannot be avoided that foreign articles such as a cloud of dust are admitted into the inside together with cooling wind. Such foreign articles are caught by, stick to, and accumulate on the core of a cooler and then clog the cooler thereby dropping the cooling capacity of the cooler. Thus, a cooling package has been proposed and placed into practical use wherein a screen (filter) is disposed forwardly of a cooler such that admission of foreign articles into the cooler is prevented by the screen.

A cooling package which includes a screen requires periodical cleaning and/or replacement of the screen because foreign articles stick to and accumulate on the screen. Upon such cleaning or replacement, a removing and mounting operation of removing the screen from the cooler and mounting it back onto the cooler is required. However, for example, in a hydraulic excavator, removal and mounting of the screen are performed with a side door on a side face of the machine body kept open. In recent years, however, an apparatus such as an air cleaner is sometimes disposed in a flow path of cooling water due to restriction to a space for disposition, and where the location forwardly of the cooler is occupied by an apparatus in this manner, it is very difficult to open the aide door and remove or mount the screen to or from the location.

In the hydraulic excavator of the type wherein the radiator 15 and the oil cooler 16 are disposed separately from each other as described above, if a side door 21A shown in FIGS. 10 and 11 is opened, then the radiator 15 can be exposed through the opening for the side door 21A. However, if an obstacle such as the air cleaner 20 shown in FIG. 10 is present forwardly of the radiator 15, then it is difficult to remove or mount a screen of the radiator 15 through the opening with the side door 21A open. Therefore, in this instance, an engine hood 22 is opened and the screen is removed or mounted through the opening for the engine hood 22. While the engine hood 22 is provided to allow maintenance of the engine 10, where the range of coverage of the engine hood 22 is extended to a location above the radiator 15 as shown in FIGS. 10 and 11, the screen of the radiator 15 can be removed or mounted through the opening when the engine hood 22 is opened.

Meanwhile, although the oil cooler 16 can be exposed, if a side door 21B is opened, through an opening for the side door 21B, similarly as in the case of the radiator 15, where there is an obstacle forwardly of the oil cooler 16, it is difficult to remove or mount the screen of the oil cooler 16 through the opening with the side door 21B opened. Further, since also the engine hood 22 is not provided so as to cover even the oil cooler 16, it is impossible to remove or mount the screen of the oil cooler 16 through the opening when the engine hood 22 is opened.

The present invention has been made in view of such subjects as described above, and it is an object of the present invention to provide a cover structure for a cooling package of a construction machine wherein, where a cooler from among different coolers such as a radiator and an oil cooler is disposed separately from an engine and the separately disposed cooler includes a screen, even where a location forwardly of the separately disposed cooler is occupied by some other apparatus, the screen can be removed and mounted without being disturbed by such apparatus.

SUMMARY OF THE INVENTION

The present invention is applied to a construction machine wherein an engine is disposed horizontally between a cabin provided at a front end portion of the construction machine in a forward and backward direction and a counterweight provided at a rear end portion of the construction machine, and particularly to a construction machine of the type described which includes a cooling package wherein a first cooling wind flow path is provided forwardly of the engine such that cooling wind may be directed to the engine while a second cooling wind flow path is provided in a juxtaposed relationship to the first cooling wind flow path between the first cooling wind flow path and the cabin, and a first cooler is disposed in the first cooling wind flow path while a second cooler is disposed in the second cooling wind flow path and a screen for preventing admission of a foreign article is disposed at least forwardly of the second cooler.

Each of the cooling wind flow paths is a path from an intake for cooling wind formed in a surface of a machine body to a fan, and the cooling wind flow paths may be isolated from each other by a partition or the like or may be included in the same space. The fan for producing a flow of cooling wind in each of the cooling wind flow paths may be driven by an electric motor, a hydraulic motor or the engine. The coolers may include a radiator for cooling water for the engine, an oil cooler for operating oil, an after cooler for a supercharger for the engine, a condenser for an air conditioner and so forth, and at least one of such coolers may be disposed in the second cooling wind flow path. The cooler disposed in the second cooling wind flow path serves as the second cooler. Preferably, one of the radiator and the oil cooler is disposed as the second cooler in the second cooling wind flow path. It is to be noted that the screen may be disposed forwardly not only of the second cooler but also of the first cooler.

The present invention provides a cover structure applied to the cooling package having such a configuration as described above and characterized in that a lid for covering the screen from above is provided on an upper face of the construction machine independently of a side door provided on a side face of the construction machine for covering the first cooler and the second cooler from forwardly and an engine hood provided on the upper face of the construction machine for covering the engine and the first cooler from above.

With such a configuration as just described, even when some other apparatus occupies the location forwardly of the second cooler, it is possible to open the lid and remove or mount the screen through the opening for the lid. Therefore, cleaning of the screen can be performed very readily. It is to be noted that, where another screen is disposed also forwardly of the first cooler, since the engine hood extends to the location above the first cooler, it is possible to open the engine hood and remove or mount the screen through the opening for the engine hood.

Preferably, the cover structure is configured such that the lid has an intake formed therein for taking cooling wind into the second cooling wind flow path. This makes it possible to take cooling wind efficiently into the second cooling wind flow path. In this instance, more preferably a lid formed from a grating is used. This makes it possible to assure a sufficient opening area to take in cooling wind and to achieve a high cooling performance. Further, since the location between the engine hood and the cabin is a place on which an operator walks, it is important to secure strength sufficient to support the walking of the operator. In this regard, if a grating is used, then sufficient strength can be secured, and besides, since it is light in weight, it does not provide difficulty in opening and closing operations.

Preferably, the lid is attached to a stationary member (first stationary member) on the upper face of the construction machine using a hinge. Where a hinge is used in this manner, the lid can be opened and closed readily. Further, also it is possible to prevent loss of the lid or loss of a fastening bolt or the like. Preferably, the opening and closing directions of the lid are set such that the lid can be pivotally opened toward the side door around the hinge. In particular, the first stationary member is disposed between the lid and the side door, such that the opening and closing directions of the lid are set in this manner, a removing or mounting operation of the screen in a state wherein the operator gets on the construction machine is facilitated. Particularly, in this instance, both of the lid and the first stationary member are formed from a grating, and the gratings are welded to each other through the hinge. By this, a greater opening area for taking cooling wind into the second cooling wind flow path can be assured, and also increased strength can be assured. It is to be noted that the opening angle of the lid by the hinge is preferably set to a range of 120 to 140 degrees. More preferably, the opening angle is set to 130 degrees. By this, the opening and closing operations can be performed further readily.

Preferably, the closed position of the lid is defined by a second stationary member provided on the upper face of the construction machine such that the lid is positioned between the first and second stationary members, and when the lid is in the closed state, the lid and the second stationary member are connected to each other by a connection member. By this, when the lid is in the closed state, the opposite end portions thereof are coupled to the first stationary member and the second stationary member, and the strength at the portion at which the lid is provided can be assured sufficiently.

With regard to the positional relationship of the lid and the engine hood on the upper face of the construction machine, preferably the engine hood is attached to the upper face of the construction machine such that the disposed position of the lid and the disposed position of the engine hood partly overlap with each other and the engine hood covers part of said lid in the closed position. Where such a positional relationship as just described is used, in order to open the lid, it is a requirement to open the engine hood (usually with a lock), and therefore, a vandalism (mischief prevention) function can be provided without provision of a lock. Particularly, in this instance, if a knob for an opening or closing operation is provided on the lid such that the knob is accommodated on the inner side of the engine hood when the lid is in the closed state, then the opening and closing operations of the lid can be performed further readily while the vandalism function is assured.

BRIEF DESCRIPTION OF THE DRAWINGS

FIG. 1 is a perspective view showing a general configuration of a cover structure according to an embodiment of the present invention;

FIG. 8 is a perspective view showing essential part of the cover structure of FIG. 1 and illustrating the cleaning procedure of the screen;

FIG. 11 is a perspective view showing a cover structure of the hydraulic excavator of FIG. 11.

DETAILED DESCRIPTION OF THE INVENTION

In the following, embodiments of the present invention are described with reference to the drawings.

Figure 10:
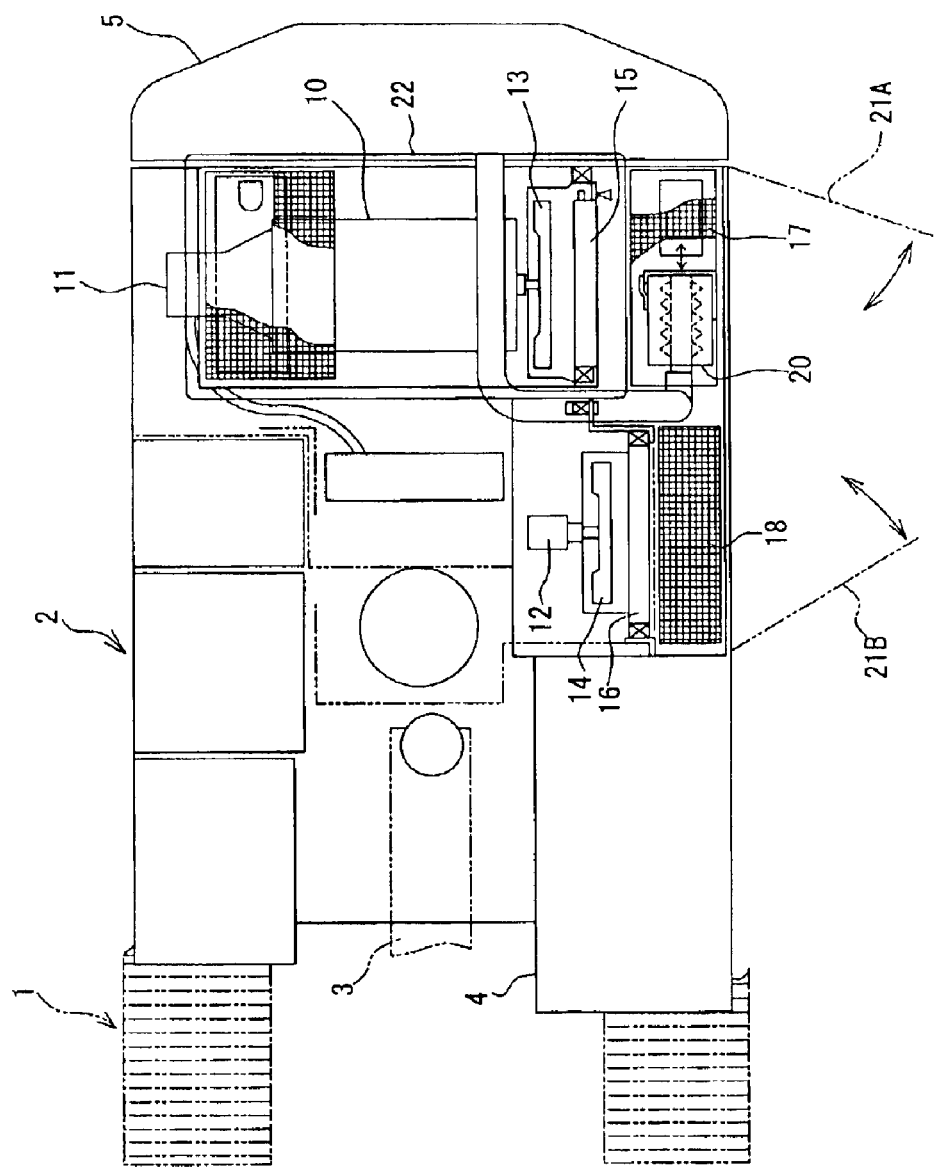
FIG. 10 is a schematic plan view showing a configuration of a conventional hydraulic excavator.

FIGS. 1 to 8 show an embodiment of the present invention. Here, the present invention applied to the conventional hydraulic excavator described with reference to FIGS. 10 and 11 as an example is described. It is to be noted that, in FIGS. 1 to 8, like elements to those of the conventional structure shown in FIGS. 10 and 11 are denoted by like reference characters.

First, an outline of the cover structure according to the present embodiment is described with reference to FIG. 1.

As shown in FIG. 1, in the present embodiment, similarly as in the conventional arrangement, side doors 21A and 21B of the folding type are provided on a side face of an upper revolving unit 2 such that, when the side doors 21A and 21B are opened, a radiator (first cooler) 15 and an oil cooler (second cooler) 16 can be exposed through an opening for the side doors 21A and 21B. The side door 21A is attached at one end portion thereof by means of a hinge on a support plate 23 provided uprightly to a floor face 2a adjacent a counterweight 5 while the side door 21B is attached at one end portion thereof by means of another hinge to another support plate 24 provided uprightly adjacent a cabin not shown, and the other end portions of them can be secured to a further support plate 25 provided uprightly at a central portion of the floor face 2a.

The support plates 23 to 25 function also as partition walls for defining flow paths for cooling wind. In particular, here, a flow path (first cooling wind flow path) 7 for cooling wind to flow to the radiator 15 is defined by the support plates 23 and 25, and another flow path (second cooling wind flow path) 8 for cooling wind to flow to the oil cooler 16 is defined by the support plates 24 and 25. Further, the support plates 23 to 25 function also as support members for supporting fixed covers 26 and 27 disposed on an upper face of the upper revolving unit 2. A grating is used for the fixed covers 26 and 27 (in the following description, the fixed covers are referred to as fixed gratings), and the fixed grating 26 is fastened to the support plates 23 and 25 while the other fixed grating 27 is fastened to the support plates 24 and 25, each at the opposite ends thereof in the longitudinal direction (forward and backward direction of the construction machine) by tightening bolts. The fixed gratings 26 and 27 function as intakes 17 and 18 for taking cooling wind into the cooling wind flow paths 7 and 8 by a structure having a great opening area.

Further, similarly as in the conventional arrangement, an engine hood 22 is provided on the upper face of the upper revolving unit 2 such that, if the engine hood 22 is opened, an engine not shown and the radiator 15 can be exposed through an opening for the engine hood 22. The engine hood 22 is attached at one end portion thereof for pivotal motion to the counterweight 5 such that it is pivotally opened from the cabin side to the counterweight 5 side. Where a screen is disposed on the front face of the xadiator 15, it can be extracted to the outside by pulling it out upwardly through the opening when the engine hood 22 is opened. It is to be noted that a latch not shown is provided for each of the engine hood 22 and the side doors 21A and 21B so that they can be latched if necessary.

Furthermore, in the present embodiment, a removable screen 19 is disposed on the front face of the oil cooler 16, and a lid 30 is provided for opening and closing movement above the screen 19. The screen 19 is positioned on the front face of the oil cooler 16 with the opposite ends thereof fitted in guide grooves not shown. By opening the lid 30 and pulling up the screen 19 upwardly along the guide grooves, the screen 19 can be extracted to the outside through the opening when the lid 30 is opened.

Figure 2:
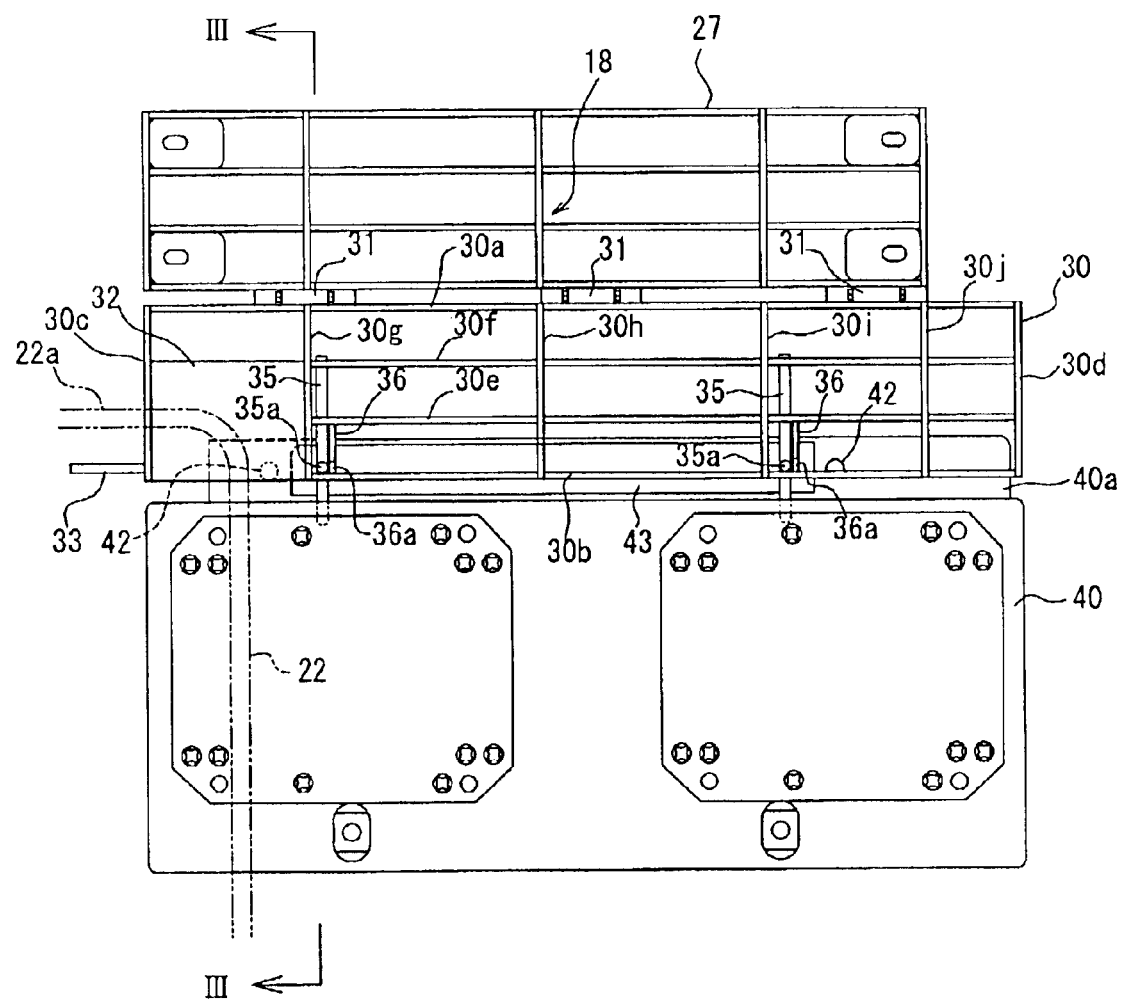
FIG. 2 is a plan view showing essential part of the cover structure shown in FIG. 1.

In the following, the lid 30 and a structure around the lid 30 are described in detail with further reference to FIGS. 2 to 4. As shown in FIG. 2, the lid 30 is formed as a latticed grating wherein, within a space surrounded on all sides by frame plates 30a, 30b, 30c, and 30d, two flat plates 30e and 30f are disposed in parallel to the frame plates 30a and 30b which provide the major side while four flat plates 30g, 30h, 30i and 30j are disposed in parallel to the frame plates 30c and 30d which provide the minor side and they are welded to each other, and is disposed such that the cross direction (longitudinal direction) thereof is directed in the forward and backward direction of the construction machine (refer to FIG. 1). The length of the major side of the lid 30 is set to a length greater than the width of the screen 19 so that the screen 19 shown in FIG. 1 can be extracted through the opening when the lid 30 is opened. Meanwhile, the length of the minor side is set to such a degree that there is no trouble when an operator puts its hands in through the opening when the lid 30 is opened to pull out the screen 19.

The lid 30 is supported at a portion thereof adjacent the side door by the fixed grating (first stationary member) 27 and at another portion adjacent the center of the machine body by a base plate (second stationary member) 40. The fixed grating 27 is fastened at the opposite end portions thereof in the longitudinal direction (forward and backward direction of the construction machine) thereof to the support plates 24 and 25 (only the support plate 25 is shown in FIGS. 3 and 4) by means of bolts 29 as described hereinabove. The lid 30 is attached at a side face of the frame plate 30a thereof adjacent the side door for pivotal motion to the fixed grating by means of three hinges 31. The lid 30 and the hinges 31, and the hinges 31 and the fixed grating 27, are both joined together by welding. The lid 30 functions, due to a structure thereof which has a great opening area, as the intake 18 for taking cooling wind into the second cooling wind flow path 8. It is to be noted that the attached positions of the hinges 31 are adjusted so that the upper face of the lid 30 and the upper face of the fixed grating 27 may be substantially flush with each other in a closed state of the lid 30 as shown in FIG. 3. Further, a hinge whose maximum opening angle is limited to 130 degrees in the open state of the lid 30 as shown in FIG. 4 is adopted for the hinges 31.

Meanwhile, the base plate 40 is fastened, at a flange portion 40a formed at an end thereof adjacent the side door, to an upper face of a support member 41 for the oil cooler 16 by means of bolts 42. The flange portion 40a and the support member 41 make contact face-to-face with each other over a widthwise direction (forward and backward direction of the vehicle body) so that returning of air from between the base plate 40 and the support member 41 is prevented.

Figure 3:
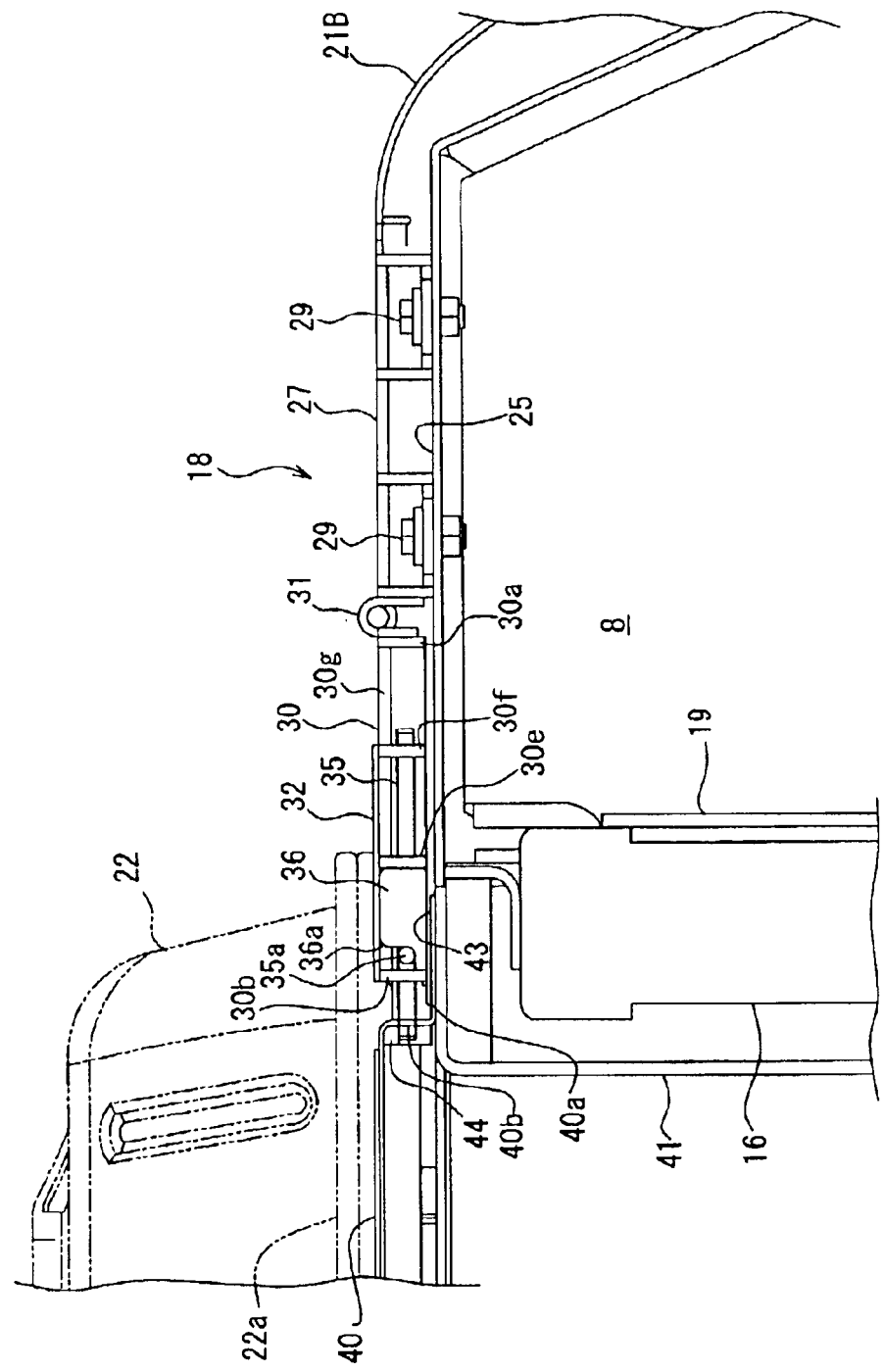
FIG. 3 is a sectional view taken along line III—III of FIG. 2.
Figure 4:
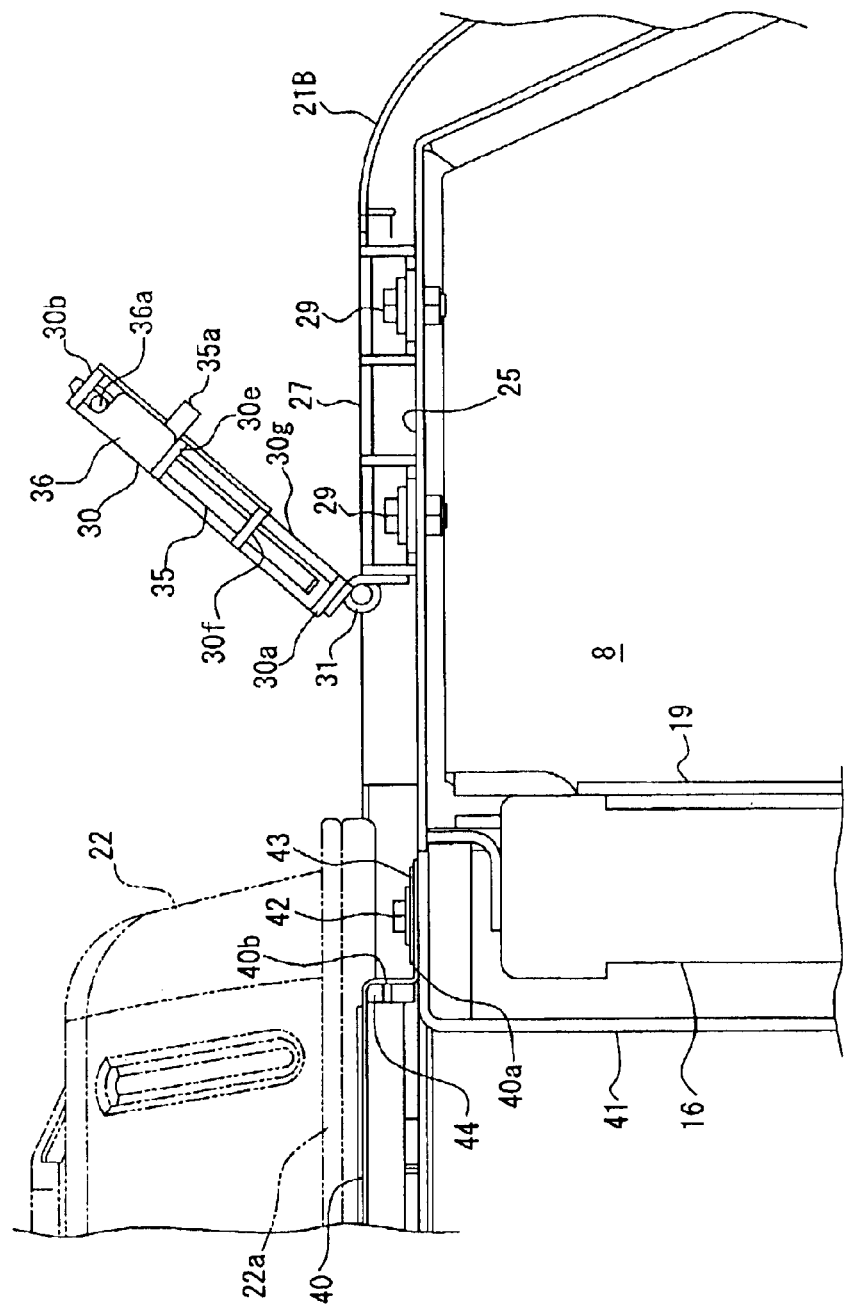
FIG. 4 is a sectional view when a lid is in an open state in FIG. 3.

The closed position of the lid 30 is defined by the flange portion 40a of the base plate 40, and in the closed state of the lid 30, the frame plate 30b of the lid 30 adjacent the center of the machine body is received by the upper face of the flange portion 40a as shown in FIG. 3. Rubber (resilient member) 43 is adhered to the contact face of the flange portion 40a with the lid 30 in order to suppress an impact when the lid 30 is closed or vibrations in the closed state of the lid 30 through contact between different metal elements. The height of the flange portion 40a is set ee such that the upper face of the lid 30 and the upper face of the base plate 40 may be substantially flush with each other in a state wherein the lid 30 is placed on the rubber 43. It is to be noted that, on the frame plate 30b of the lid 30 adjacent the center of the machine body, recesses 30k (refer to FIG. 7 hereinafter described) are formed in conformity with the positions of the bolts 42, which fasten the flange portion 40a to the support member 41, in order to prevent interference with the bolts 42.

Fixation of the lid 30 to the base plate 40 is performed by connecting the lid 30 to the base plate 40 using round drop bars (connection members) 35. In the frame plate 30b of the lid 30 and the two central flat plates 30e and 30f parallel to the frame plate 30b, through-holes not shown are formed at corresponding positions to each other. The round drop bars 35 are fitted in the through-holes such that they can be slidably moved in the vertical direction of the lid 30. Meanwhile, also on the base plate 40 side, through-holes 40b are formed corresponding to the sliding direction of the round drop bars 35. The round drop bars 35 are fitted in the through-holes 40b of the base plate 40 so that the lid 30 and the base plate 40 are connected to each other by the round drop bars 35 to restrict the opening movement of the lid 30. It is to be noted that, a receiving member 44 for receiving the round drop bars 35 is provided on the interior side of the through-holes 40b of the base plate 40. A thick plate having a high strength and a high abrasion resisting property is adopted for the receiving member 44. Further, in order to prevent fixation by rust, stainless steel is used as a material for the round drop bars 35.

The round drop bars 35 are provided at two locations in the proximity of the flat plates 30g and 30i disposed in the vertical direction of the lid 30. The positions at which the round drop bars 35 are provided are also positions in the proximity of the fastened positions of the flange portion 40a to the support member 41 by the bolts 42. Since the connection positions by the round drop bars 35 and the fastened positions by the bolts 42 are in the proximity of each other in this manner, the strength when the lid 30 in the closed state is pulled upwardly is assured.

A lock handle 35a is provided in a projecting manner on each of the round drop bars 35 and extends perpendicularly to the axis of the round drop bar 35. A hang plate 36 is welded to and extends between the frame plate 30b and the flat plate 30e adjacent the frame plate 30b in the proximity of each of the round drop bars 35. A lock groove 36a is formed on the hang plate 36 such that it is open to the upper face side of the lid 30. If the round drop bars 35 are fitted into the through-holes 40b of the base plate 40 and then the lock handles 35a are hooked in the lock grooves 36a, then the round drop bars 35 are locked against sliding movement and prevented from being pulled off the through-holes 40b. Further, since each of the lock handles 35a moves within a range sandwiched and restricted by the hang plate 36 and the flat plate 30g or the flat plate 30i, such a disadvantageous situation that the lock handles 35a are directed downwardly during operation and make the operation difficult is prevented.

A thin iron plate 32 is adhered to part of the upper face of the lid 30, or more particularly at an end portion adjacent the engine hood 22, such that it covers over an area surrounded by the frame plates 30b and 30c and the frame plates 30f and 30g. As indicated by an alternate long and two short dashes line in FIG. 2, in the present embodiment, the disposed position of the lid 30 is set such that the engine hood 22 overlaps with part of the lid 30. Since a rubber frame 22a is attached to the engine hood 22, there is the possibility that, if the engine hood 22 is placed directly on the grating, the rubber frame 22a may break. Therefore, the iron plate 32 is adhered to the portion at which the rubber frame 22a interferes with the engine hood 22 to prevent damage to the rubber frame 22a.

Further, an operating rod (knob) 33 for operating the lid 30 to open or close is attached to a side face of the frame plate 30c adjacent the counterweight such that it is directed to the counterweight side. As described above, part of the lid 30 is covered with the engine hood 22, and in the closed state of the lid 30, also the operating rod 33 is hidden below the engine hood 22.

The configuration of the cover structure according to the present invention is such as described above, and in the following, advantages of the cover structure described above are described together with a cleaning procedure for the screen 19 in the present embodiment with reference to FIGS. 5 to 8.

Figure 5:
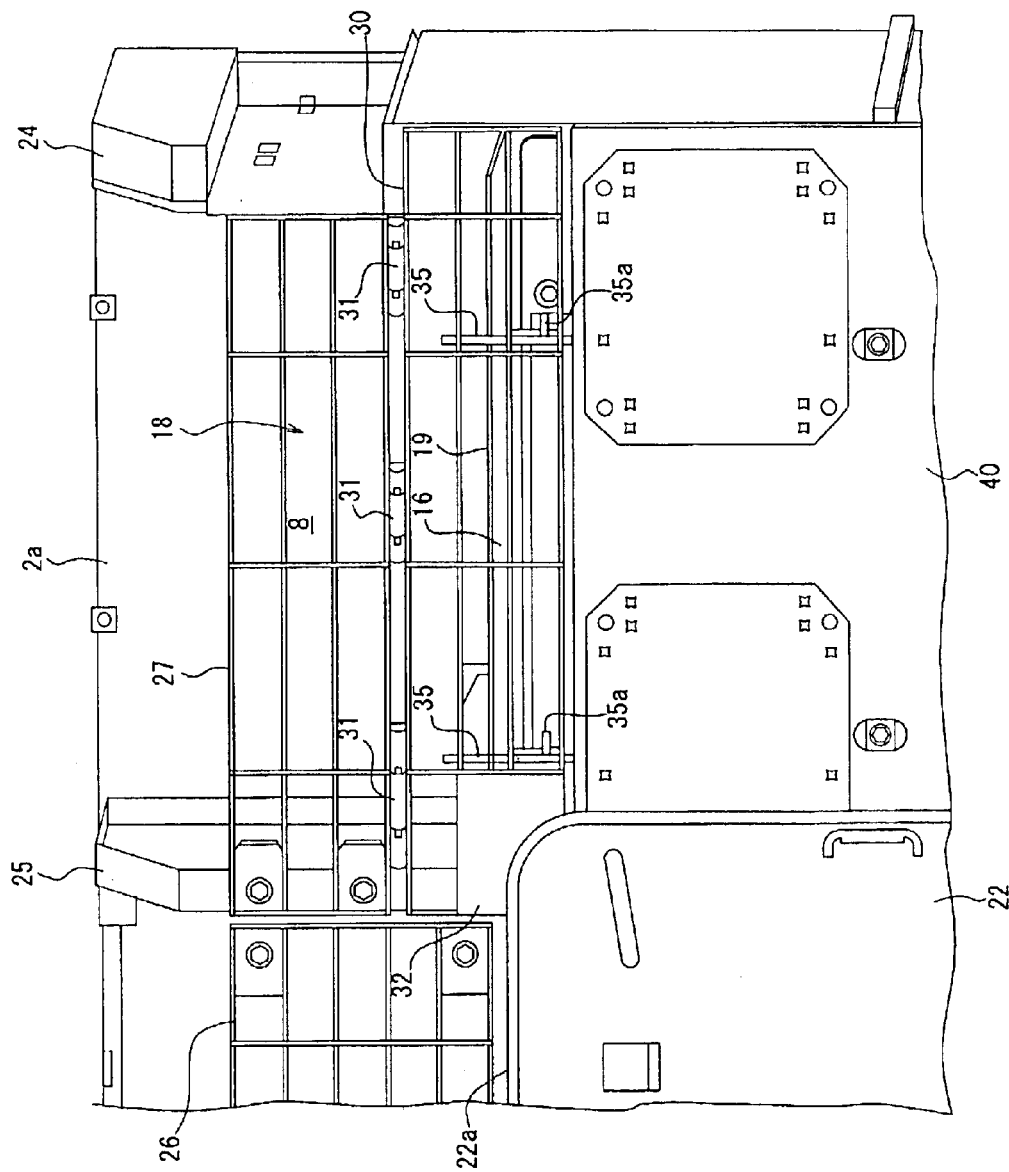
FIG. 5 is a perspective view showing essential part of the cover structure of FIG. 1 and illustrating a cleaning procedure of a screen.

First, FIG. 5 is a perspective view when the lid 30 and several elements around the lid 30 are viewed from obliquely upward of the machine body in a state wherein both of the engine hood 22 and the lid 30 are closed. In this state, since the engine hood 22 holds part of the lid 30, even if the round drop bars 35 are slidably moved to unlock the base plate 40 and the lid 30 from each other and then the lid 30 is pulled upwardly, it is impossible to open the lid 30. Accordingly, the lid 30 is not opened inadvertently by mischief at all. In short, a vandalism function is assured sufficiently.

Although the screen 19 prevents admission of foreign articles into the oil cooler 16, if soil sticks to the screen 19, then the cooling efficiency of the oil cooler 16 drops. Accordingly, it is necessary to usually check the degree of soiling to the screen 19 and clean the screen 19 if soil sticks to some degree to the screen 19. Although the degree of soiling to the screen 19 can be confirmed by visual observation, according to the cover structure described above, since the lid 30 is formed from a grating having a large opening area, the degree of soiling to the screen 19 can be confirmed readily even from above the upper face of the machine body. At this time, even if the operator steps on the lid 30, since the lid 30 itself is formed from a grating having a sufficient strength and the load at the connecting portions between the lid 30 and the fixed grating 27 is dispersed by the three hinges 31, the lid 30 is not damaged or deformed irrespective of the weight of the operator. Further, since such a great opening area as described above is assured not only with the fixed grating 27 but also with the lid 30, a large amount of cooling wind can be taken into the inside, arid there is an advantage also than a high cooling performance can be achieved.

Figure 6:
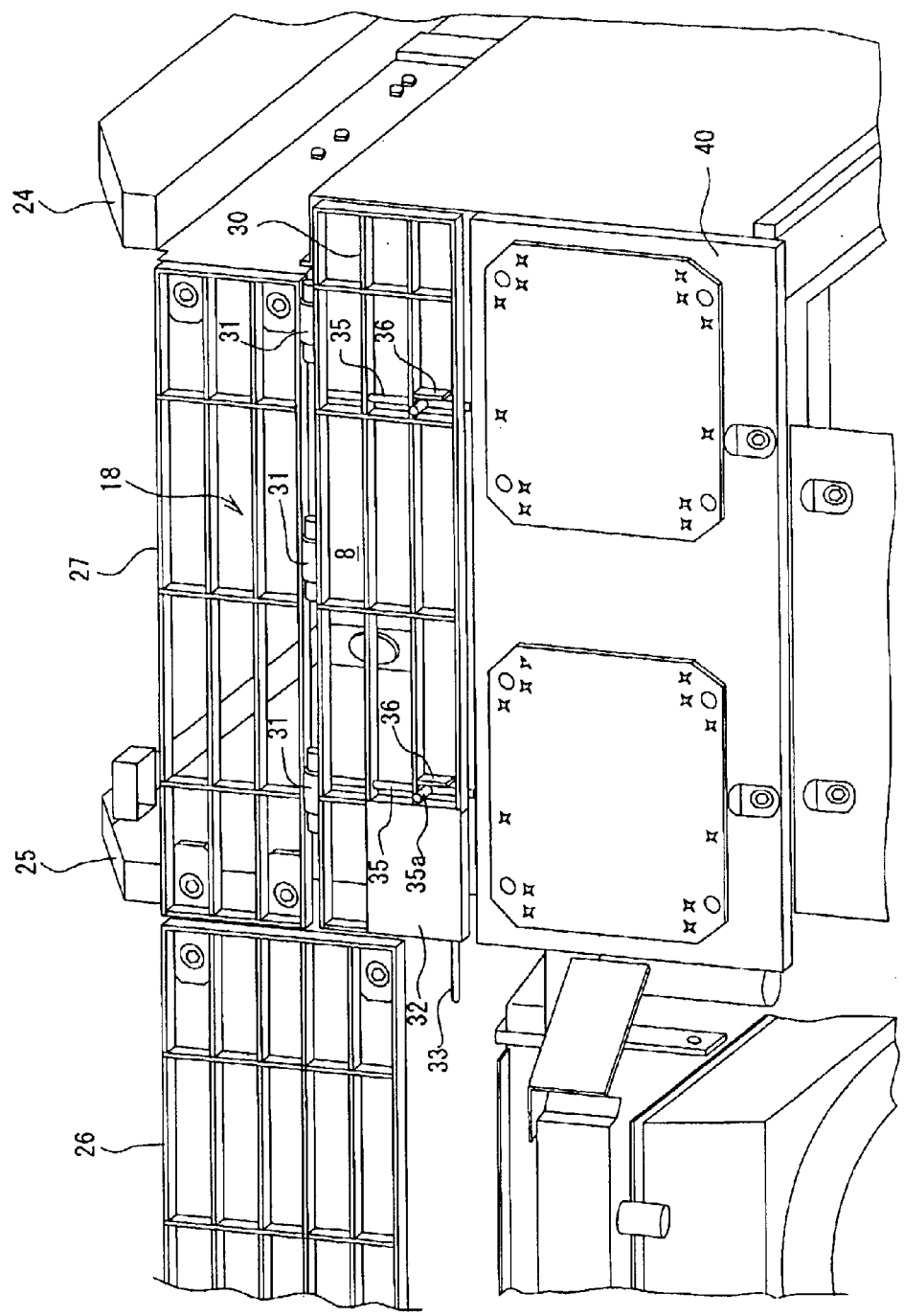
FIG. 6 is a perspective view showing essential part of the cover structure of FIG. 1 and illustrating the cleaning procedure of the screen.

In order to clean the screen 19, the operator gets on the upper face of the machine body, unlatches the engine hood 22 and opens the engine hood 22. When the engine hood 22 is opened, the operating rod 33 for opening and closing operation appears on the side face of the lid 30 as shown in FIG. 6. Then, the round drop bars 35 are slidably moved to the outer side of the machine body (toward the side door) to unlock the base plate 40 and the lid 30 from each other.

Figure 7:
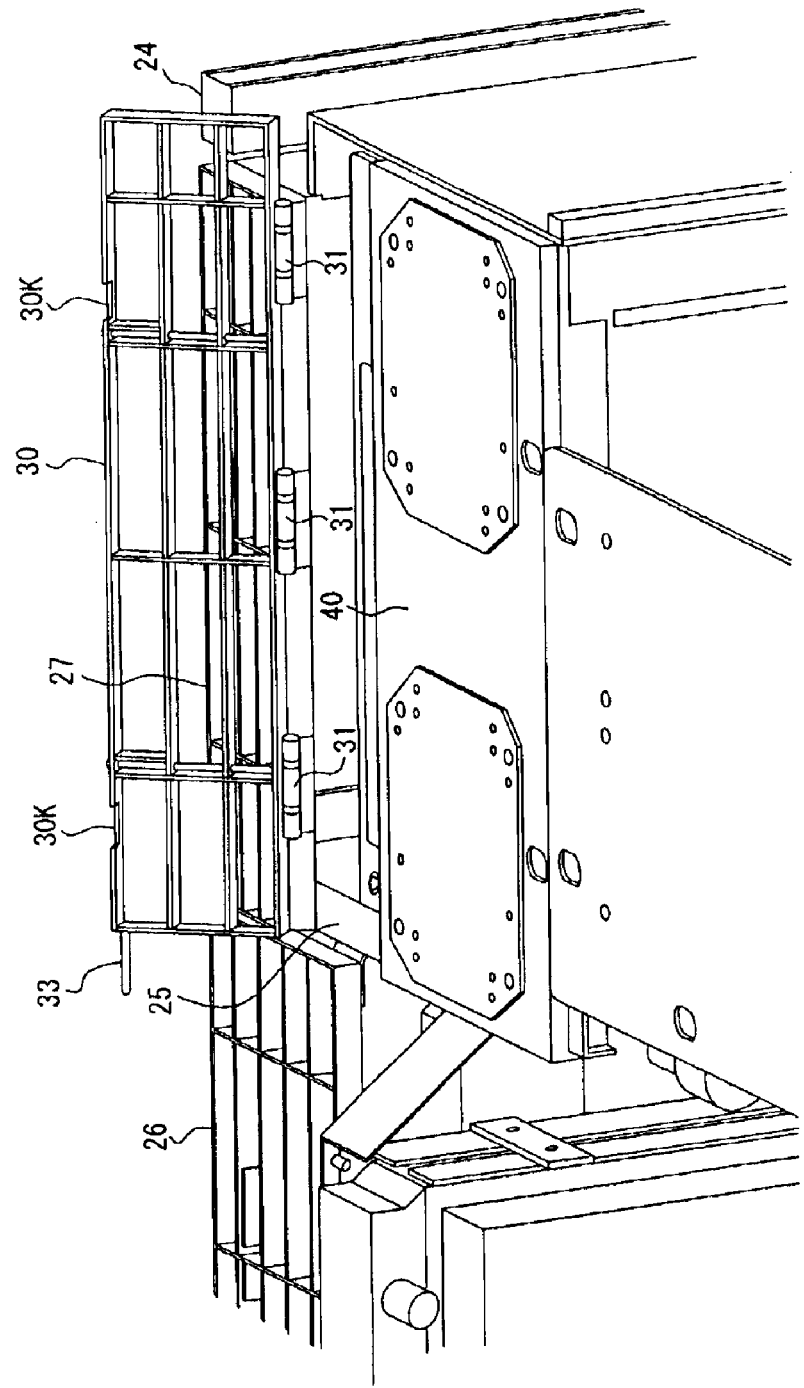
FIG. 7 is a perspective view showing essential part of the cover structure of FIG. 1 and illustrating the cleaning procedure of the screen.

Then, the lid 30 is pivoted to the outer side of the machine body around the hinges 31 into an open state as shown in FIG. 7. Since the lid 30 is formed from a grating, it is light in weight for its strength and can be opened readily. At this time, by gripping the operating rod 33 and raising the lid 30 to pivot, the operator can open the lid 30 readily without having its finger caught by the lid 30 at all. Further, thanks to the hinges 31 which limit the opening angle of the lid 30 to 130 degrees, such a situation that a finger is caught between the lid 30 and the fixed grating 27 does not occur.

After the lid 30 is opened, the screen 19 is pulled upwardly and taken out as shown in FIG. 8. Then, the thus taken out screen 19 is cleaned with high pressure air or the like and then placed back into the inside through the opening with the lid 30 open and attached to the front face of the oil cooler 16. At this time, since the lid 30 is open to the outside of the machine body, the operator who stands adjacent the base plate 40 does not hit at its hand or foot upon the lid 30 and can remove and mount the screen 19 readily.

After the screen 19 is accommodated, the lid 30 is closed, and then the round drop bars 35 are slidably moved toward the base plate 40 and the base plate 40 and the lid 30 are locked to each other. Then, the engine hood 22 is closed and then the latch not shown for the engine hood 22 is locked. A series of cleaning operations for the screen 19 is completed thereby. In this manner, according to the present cover structure, the operator can remove and mount the screen 19 without a tool at all, that is, in a tool-less fashion.

It is to be noted that, while, FIGS. 5 to 8 show the side doors 21A and 21B in an open state, since the cleaning procedure for the screen 19 in the present embodiment does not have any relation to the open or closed state of the side doors 21A and 21B, there is no problem even if the side doors 21A and 21B are kept closed.

Figure 9:
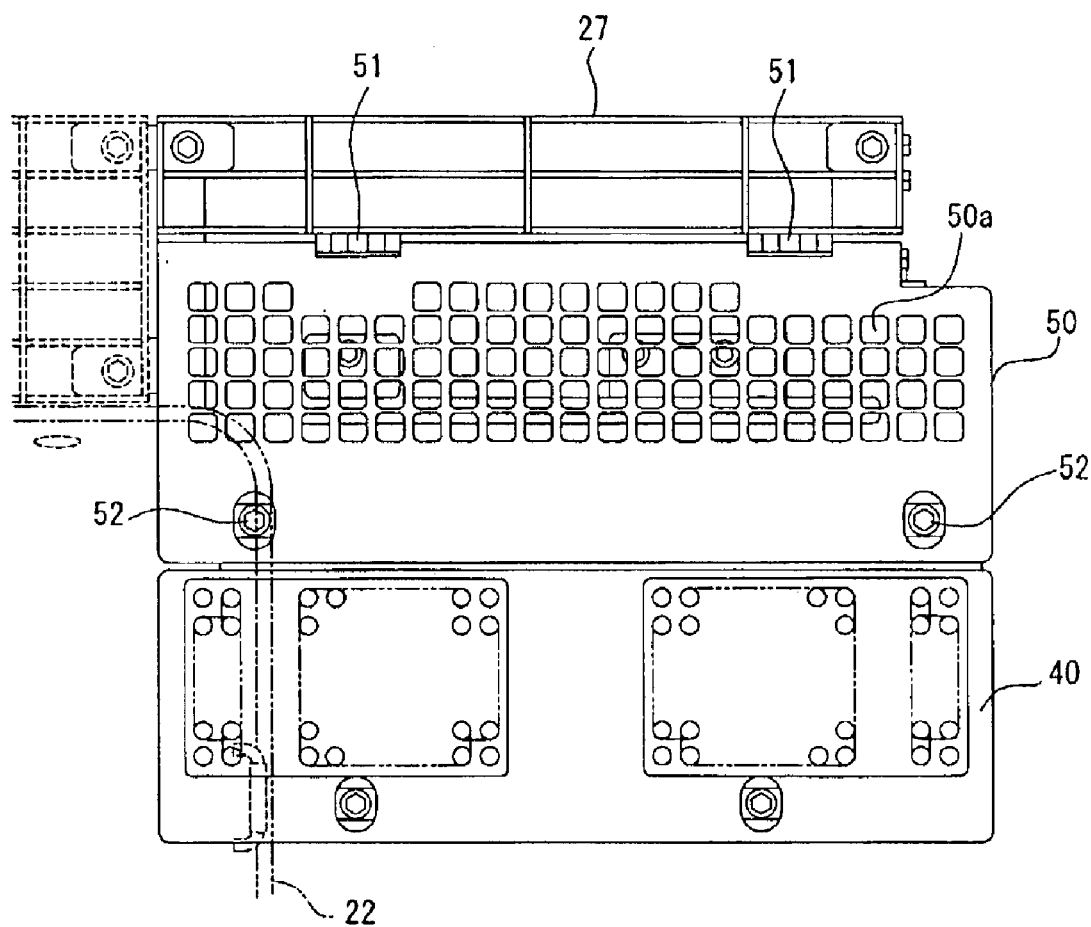
FIG. 9 is a plan view showing another embodiment of the present invention.

While an embodiment of the present invention is described above, the present invention is not limited to the embodiment described above but can be carried out in various modified forms without departing from the spirit and scope of the present invention. For example, while, in the embodiment described above, a lid formed from a grating is used, a lid 50 formed from an iron plate may be used as shown in FIG. 9. However, since an iron plate is lower in strength than a grating, preferably the lid 50 is reinforced by a reinforcement member provided on the rear face of the lid 50. Further, it is preferable to form a plurality of intakes 50*a* on a surface of the lid 50 so that cooling wind can be taken into the cooling wind flow path together with the fixed grating 27. It is to be noted that, in FIG. 9, the lid 50 is mounted for pivotal motion on the fixed grating 27 by means of hinges 51 while the lid 50 and the base plate 40 are fastened together by means of bolts 52.

Further, the present invention can be applied not only to such a hydraulic excavator as in the embodiment described hereinabove but also to various construction machines irrespective of whether they are of the traveling type or of the fixed type only if they include a cooling package wherein an engine is disposed horizontally between a cabin provided at a front end portion and a counterweight provided at a rear end portion and a first cooling wind flow path is provided forwardly of the engine such that cooling wind may be directed to the engine while a second cooling wind flow path is provided in a juxtaposed relationship to the first cooling wind flow path between the first cooling wind flow path and the cabin, and a first cooler is disposed in the first cooling wind flow path while a second cooler is disposed in the second cooling wind flow path and a screen for preventing admission of a foreign article is disposed forwardly of the second cooler.

INDUSTRIAL APPLICABILITY

As described above, the cover structure for a cooling package of a construction machine of the present invention is suitable for use with a cooling package of a structure wherein a cooler from among coolers such as a radiator and an oil cooler is disposed separately from an engine and the separately disposed cooler includes a screen.

What is claimed is:

1. A cover structure for a cooling package of a construction machine having, an engine disposed horizontally between a cabin provided at a front end portion of the construction machine in a forward and backward direction, a counterweight provided at a rear end portion of the construction machine, a first cooling wind flow path provided forwardly of the engine such that cooling wind may be directed to the engine, a second cooling wind flow path provided in a juxtaposed relationship to the first cooling wind flow path between the first cooling wind flow path and the cabin, a first cooler disposed in the first cooling wind flow path; a second cooler disposed in the second cooling wind flow path; and a screen, for preventing admission of a foreign article, disposed forwardly of the second cooler, the cover structure comprising:

a side door provided on a side face of said construction machine for covering said first cooler and said second cooler;

an engine hood provided on an upper face of said construction machine for covering said engine and said first cooler from above; and a lid, having an intake formed therein for taking cooling wind into said second cooling wind flow path, provided on the upper face of said construction machine for covering said screen from above, said lid being attached to a first stationary member on the upper face of the construction machine by a hinge.

2. The cover structure for a cooling package of a construction machine as set forth in claim 1, wherein said lid is formed from a grating.

3. The cover structure for a cooling package of a construction machine as set forth in claim 1, wherein said first stationary member is disposed between said lid and said side door such that said lid pivotally opens toward said side door about said hinge.

4. The cover structure for a cooling package of a construction machine as set forth in claim 1, wherein the opening angle of said lid is within a range of 120 to 140 degrees.

5. The cover structure for a cooling package of a construction machine as set forth in claim 1, further comprising:
a second stationary member provided on the upper face of said construction machine, such that said lid is positioned between said first stationary member, said second stationary member defining a closed position for receiving said lid when said lid is in a closed stated; and
a connection member connecting said lid and said second stationary member when said lid is in the closed state.

6. The cover structure for a cooling package of a construction machine as set forth in claim 1, wherein said engine hood is attached to the upper face, such that at least a part of said engine hood overlaps with said lid when said engine hood is closed and said lid is in a closed position.

7. The cover structure for a cooling package of a construction machine as set forth in claim 6, wherein said lid has a knob for an opening or closing operation of said lid such that said knob is positioned below said engine hood when said lid is in the closed state.

8. A construction machine, comprising:
an engine;
a counterweight;
a cooling wind flow path provided between the engine and the counterweight;
a cooler disposed in the cooling wind flow path;
a screen, for preventing admission of a foreign article to the cooler, disposed in the cooling wind flow path at an upstream side of the cooler;
a first stationary member having an upper surface; and
a lid, having an intake opening for allowing air into said cooling wind flow path, attached to said first stationary member by a hinge for covering said screen from above.

9. The construction machine according to claim 8, wherein said lid is formed of a grating.

10. The construction machine according to claim 8, further comprising:
a second stationary member provided on the upper surface such that said lid is positioned between said first stationary member, said second stationary member defining a closed position for receiving said lid when said lid is in a closed state; and
a connection member that engages said lid with said second stationary member when said lid is in the closed state.

11. The construction machine according to claim 8, further comprising:
an engine hood attached to the upper surface to cover the engine,
wherein at least a part of said engine hood overlaps with said lid when said engine hood is closed and said lid is in a closed position.

12. The construction machine according to claim 11, wherein said lid has a knob for an opening or closing operation of said lid, said knob being positioned below said engine hood when said lid is in the closed state and the engine hood is closed.

13. A construction machine, comprising:
a cooling wind flow path provided between an engine and a counterweight;
a cooler disposed in the cooling wind flow path;
a receiving portion for receiving a removable element, for preventing admission of a foreign article to the cooler, disposed in the cooling wind flow path;
a first stationary member having an upper surface; and
a lid rotatably mounted on said first stationary member to allow removal and installation of the removable element to the receiving portion by rotating said lid.

14. The construction machine according to claim 13, wherein said lid is formed of a grating to allow air into said cooling wind flow path.

15. The construction machine according to claim 13, further comprising:
a second stationary member provided on the upper surface such that said lid is positioned between said first stationary member, said second stationary member defining a closed position for receiving said lid when said lid is in a closed state; and
a connection member that engages said lid with said second stationary member when said lid is in the closed state.

16. The construction machine according to claim 13, further comprising:
an engine hood attached to the upper surface to cover the engine,
wherein at least a part of said engine hood overlaps with said lid when said engine hood is closed and said lid is in a closed position.

17. The construction machine according to claim 16, wherein said lid has a knob for an opening or closing operation of said lid, said knob being positioned below said engine hood when said lid is in the closed state and the engine hood is closed.

18. A cover structure for a cooling package of a construction machine having, an engine disposed horizontally between a cabin provided at a front end portion of the construction machine in a forward and backward direction, a counterweight provided at a rear end portion of the construction machine, a first cooling wind flow path provided forwardly of the engine such that cooling wind may be directed to the engine, a second cooling wind flow path provided in a juxtaposed relationship to the first cooling wind flow path between the first cooling wind flow path and the cabin, a first cooler disposed in the first cooling wind flow path; a second cooler disposed in the second cooling wind flow path; and a screen, for preventing admission of a foreign article, disposed forwardly of the second cooler, the cover structure comprising:
a side door provided on a side face of said construction machine for covering said first cooler and said second cooler;
an engine hood provided on an upper face of said construction machine for covering said engine and said first cooler from above; and
a lid, having an intake formed therein for taking cooling wind into said second cooling wind flow path, provided on the upper face of said construction machine for covering said screen from above.

19. The cover structure for a cooling package of a construction machine as set forth in claim 18, wherein said lid is formed from a grating.

20. The cover structure for a cooling package of a construction machine as set forth in claim 18, wherein said lid is attached to a first stationary member on the upper face of the construction machine by a hinge.

21. The cover structure for a cooling package of a construction machine as set forth in claim 20, wherein said first stationary member is disposed between said lid and said side door such that said lid pivotally opens toward said side door about said hinge.

22. The cover structure for a cooling package of a construction machine as set forth in claim 20, wherein the opening angle of said lid is within a range of 120 to 140 degrees.

23. The cover structure for a cooling package of a construction machine as set forth in claim 20, further comprising:

a second stationary member provided on the upper face of said construction machine, such that said lid is positioned between said first stationary member and said second stationary member, said second stationary member defining a closed position for receiving said lid when said lid is in a closed state; and a connection member connecting said lid and said second stationary member when said lid is in the closed state.

24. The cover structure for a cooling package of a construction machine as set forth in claim 20, wherein said engine hood is attached to the upper face, such that at least a part of said engine hood overlaps with said lid when said engine hood is closed and said lid is in a closed position.

25. The cover structure for a cooling package of a construction machine as set forth in claim 24, wherein said lid has a knob for an opening or closing operation of said lid such that said knob is positioned below said engine hood when said lid is in the closed state.

* * * * *